United States Patent

[11] 3,630,225

| [72] | Inventor | Paul Chitel<br>355 St. Clair Ave. W., Apt. 704, Toronto, Ontario, Canada |
|------|----------|---|
| [21] | Appl. No. | 5,668 |
| [22] | Filed | Jan. 26, 1970 |
| [45] | Patented | Dec. 28, 1971 |

[54] PORTABLE HEATING SYSTEM AND ACCESSORY FUEL TANK
4 Claims, 1 Drawing Fig.

[52] U.S. Cl. .................................................. 137/565, 263/19 A
[51] Int. Cl. ..................................................... F23e 15/04
[50] Field of Search........................................... 263/19 A; 431/344; 137/565, 540

[56] References Cited
UNITED STATES PATENTS

| 1,965,783 | 7/1934 | Traudt.............................. | 137/565 |
| 2,586,224 | 2/1952 | Harris et al. ..................... | 137/565 X |
| 2,866,627 | 12/1958 | Sherman ......................... | 263/19 A |
| 2,998,844 | 9/1961 | Jordan............................. | 137/565 X |
| 3,439,703 | 4/1969 | Toda et al....................... | 137/540 X |

*Primary Examiner*—Henry T. Klinksiek
*Attorney*—Leon Arthurs

ABSTRACT: An accessory oil tank for a portable oil heat system having an internal pipe with an external connection through which oil is drawn from the tank by means of a pump; the internal pipe being provided with a check valve which closes to prevent oil flow therethrough when the pump is not drawing oil.

PATENTED DEC 28 1971  3,630,225
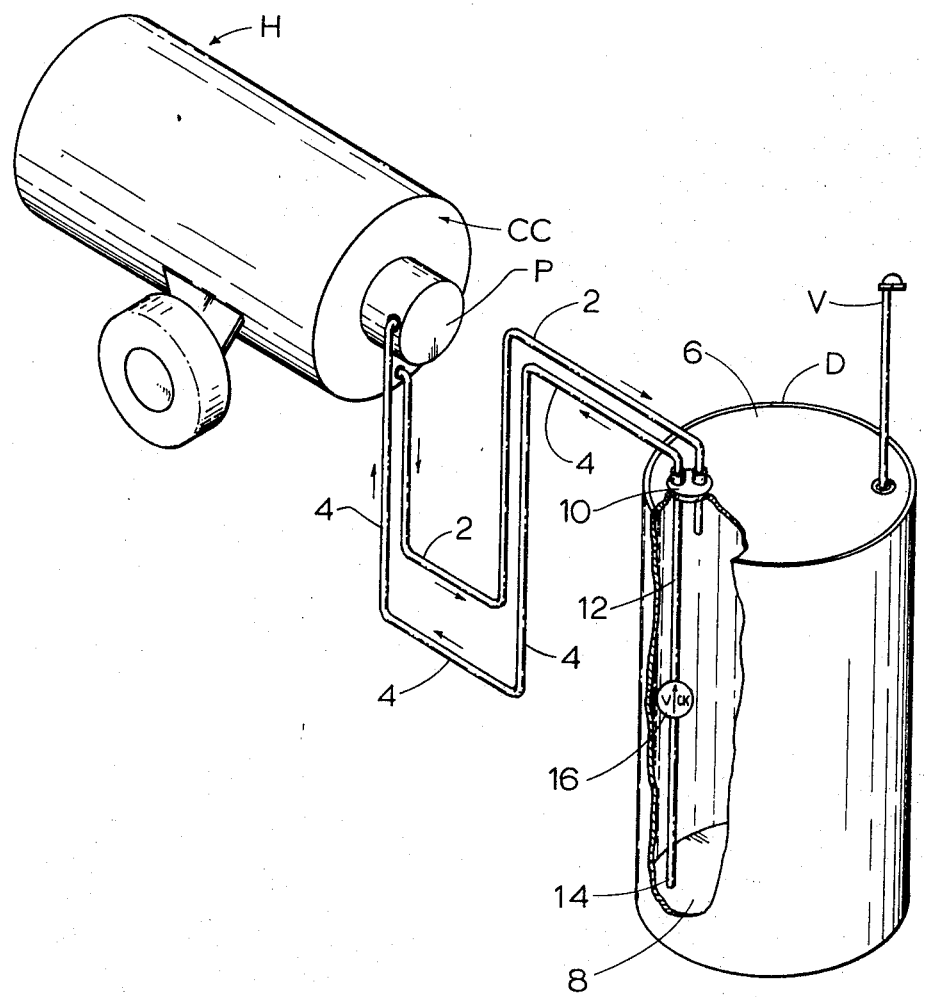
INVENTOR.
P. CHITEL
BY
Leon Arthurs
agent

PORTABLE HEATING SYSTEM AND ACCESSORY FUEL TANK

The invention relates to a portable heating system such as us frequently used to supplement or substitute temporarily for permanent heating facilities and, in addition, the invention also relates to an accessory fuel tank for such heating system.

One portable heating system as visualized by the invention is the well-known, oil fired, space heater which is designed to render emergency or temporary service and which is transportable from one location to another for such purposes. In the construction industry, for example, it is very often expedient to use equipment of this nature for heating unenclosed or partly enclosed spaces in a building under construction to avoid interruption of building operations in inclement weather.

The herein visualized heater is commonly equipped with an integral, built-in, fuel compartment and has associated therewith a pump which withdraws the oil from the fuel compartment and injects it into the combustion chamber of the heater. For the sake of portability, however, the said fuel compartment is usually small and of insufficient capacity to meet the demands of the heater in sustained or continuous duty necessitating frequent refueling—often under fairly hazardous conditions.

As its main object, the invention therefore seeks to provide a portable, liquid-fuel burning heating system as described which is fueled from a separate fuel tank of substantial capacity to which it is coupled by an intake pipe; said pump associated with said heater being then operable to withdraw fuel from said tank through said intake pipe; the tank being equipped with a safety valve which closes automatically to prevent seepage of fuel therefrom when and while it is not being withdrawn by the pump as aforesaid.

The invention meets the fueling problems of the portable heaters under present consideration by the provision of a portable accessory oil tank—e.g., a drum—of large capacity which is separate from the heater but connectable thereto by an intake pipe such as a hose through which the heater is able to pump its fuel requirements from the drum.

Additionally, the invention takes cognizance of the fact that, under the use of conditions frequently encountered, a hose and, indeed any intake pipe as herein visualized would be particularly vulnerable to damage which may, in turn, permit the drum contents to leak or be siphoned therefrom and so to create a fire peril.

Thus, the invention further contemplates that the said accessory drum be provided with a conduit on the interior of the drum coupled by one end to an exteriorly accessible outlet at the top of the drum; the other or inlet end of the conduit being disposed so that the oil withdrawn from the drum comes, preferably, from adjacent the drum bottom enabling virtually complete emptying of the drum. Installed in the described fuel delivery facilities is a valve yieldingly biased to a closed position in which it blocks the conduit and prevents oil flow therethrough. Said valve is, however, susceptible to the suction by which the heater pump withdraws oil from the drum and yields thereto by opening when and while the heater pump is in operation thereby permitting oil to be delivered to the pump as aforesaid. The valve recloses thereafter when the heater pump is stopped and, in addition, it also recloses promptly when and if the intake pipe is ruptured or disconnected inadvertently or if anything else happens to break the suction in the conduit downstream of the valve which, of course, refers to the zone between the valve and the outlet.

The respective objects and advantages of the invention will be set forth in part hereinafter more particularly and in part will be obvious herefrom or may be learned by practice of the invention; the same being realized and attained by the instrumentalities and combinations pointed out in the appended claims.

In the specification following, the elements, parts, and principles of the invention are disclosed by way of example only in relation to a selected embodiment of the inventive idea illustrated in the accompanying drawing wherein like references identify like parts throughout and wherein:

The FIGURE is a schematic view of a heating system as herein visualized including an accessory drum and with parts of the drum broken away to expose the interior thereof.

Before proceeding with a more detailed description of the present embodiment, it is deemed appropriate and desirable to reiterate and particularly stress the fact that the drawing is merely a schematic view of the said embodiment and is by no means intended to afford a faithful pictorialization of an actual heating system; the drawing emphasizing only those parts of the heating system which are of significance to the present invention and omitting others which are not significant and whether or not they are essential to the heating system.

Thus, it will be understood that the portable heater illustrated and generally identified in the drawing by the reference character H may well be of the familiar conventional type having an associated pump P which is connected to withdraw fuel from an integral fuel compartment (not shown) and to inject it into the combustion chamber of heater H generally indicated by reference device CC in which the fuel is burned to generate heat thereafter distributed in any conventional manner. In this drawing the pump P is shown as an integral part of heater H which, of course, need not be the case in actual practice.

The accessory drum D of the instant invention is connected to heater H by piping including the conventional return pipe 2 for unburnt fuel as well as an intake pipe 4 which intercouples said oil pump P and the fuel delivery means to be described which is incorporated in drum D.

In the present instance, it will be noted that the drum D is of conventional cylindrical conformation with flattened ends serving respectively as its top 6 and bottom 8.

It will be understood that while return pipe 2 and intake pipe 4 are shown in schematic as elevated, this has been done solely for the sake of clarity. Both return pipe 2 and intake pipe 4 will normally be on the ground between heater H and drum D; this being the factor which particularly exposes it to injury as hereinafter indicated; the invention being particularly designed to eliminate or at least minimize further hazards consequential upon such injury.

Mounted at its said top 6 is an outlet 10 which communicates with one end of an elongated oil conduit 12 in the interior of the drum D, the other or inlet conduit and 14 being preferably disposed adjacent the drum bottom 8 so that the fuel drawn from the drum D through conduit 12 is necessarily drawn from its bottom whereby, of course, the virtually complete emptying of drum D by pump P is facilitated.

As shown, said intake pipe 4 is coupled between drum outlet 10 and pump P which, in the present embodiment, draws fuel from drum D by suction—in other words, by creating a negative pressure within the conduit 12 which is lower than that obtaining in drum D so that liquid from drum D is forced into conduit 12 at its inlet and 14 adjacent drum bottom 8 to flow downstream through said conduit 12 to outlet 10 at the drum top 6. Said drum D may be provided with a conventional vent V as shown to facilitate the described fuel flow in a known manner.

The safety valve visualized by the present invention is preferably installed between outlet 10 and inlet end 14 of conduit 12; a median position on conduit 12 having been selected for the illustrative purposes of this submission although virtually any other position on conduit 12 would be equally effective. In this embodiment a suitable safety valve may be constituted by check valve 16 shown diagrammatically in the drawing.

Although biased to a normally closed position in which it seals conduit 12 to block or plug further fuel delivery therethrough, the valve 16 is yieldable to open whenever the downstream pressure between it and outlet 10 drops appreciably below the upstream pressure in the interior of drum D; this being a situation which occurs and recurs whenever pump P begins to operate and create suction as aforesaid.

Thus, said safety valve 16 is closed at all times when there is no imbalance of internal pressures as between conduit 12 (downstream of valve 16) and drum D. Such imbalance of pressures does arise, however, when the pump P is turned on coincidentally with the turning on of heater H for example at which point valve 16 responds to the new pressure conditions by opening to permit consequential withdrawal of fuel through the conduit 12, outlet 10 and intake pipe 4 into pump P, said valve 16 reclosing as described when the pump P is turned off.

As will be obvious, any break or rupture occurring either on intake pipe 4 or in the oil delivery facilities downstream of valve 16 will immediately rectify or negate the pressure imbalance originated by pump P whereby valve 16 will close irrespectively of whether or not the pump P is still in operation.

Thus, the described construction visualized by the invention makes it feasible to use a portable heater of the type visualized with a separate fuel tank without thereby introducing new hazards in the result.

It is of particular significance that a conventional heater H as herein visualized obviously needs very little modification to adapt it for fueling from a present drum D thereby substantially enhancing its utility. Moreover, fueling of the heater H from a separate drum D makes it quite feasible to have the fuel requirements for several days available at all times and in more than one drum if need be. In the ordinary course of events, the drums being equipped with standard fittings, very little effort is required to make the transition from one drum to another.

What I claim is:

1. A heating system comprising:
   a portable heater with a combustion chamber for liquid fuel;
   a portable drum of relatively large capacity providing a separate fuel tank for said heater;
   means incorporated in said drum for delivering fuel from the interior to the exterior thereof;
   a pump carried by said heater for fueling said combustion chamber
   a hose interconnectable between said pump and said fuel delivery means, the pump being operable to generate suction for withdrawing fuel from the drum through said hose and fuel delivery means and to supply it to the heater, said hose being long and flexible permitting spacing of the heater and the fuel tank while thus connected;
   a check valve controlling fuel flow through said fuel delivery means yieldingly biased to closed position preventing such fuel flow;
   said check valve being responsive to suction in said drum and fuel delivery means to open and permit fuel flow as aforesaid only when and for so long as the suction generated by the pump is maintained; the said check valve being biased to close and block said fuel delivery means when the suction is broken.

2. A heating system as set forth in claim 1 wherein:
   said check valve is installed in said fuel delivery means and forms a part thereof.

3. A heating system as set forth in claim 1 wherein:
   said fuel delivery means extends between the bottom and the top of said drum.

4. A heating system as set forth in claim 2 wherein:
   said fuel delivery means extends between the bottom and the top of said drum.

* * * * *